(12) United States Patent
Oldewurtel

(10) Patent No.: US 10,442,294 B2
(45) Date of Patent: Oct. 15, 2019

(54) METHOD AND SYSTEM FOR MAKING DATA AVAILABLE IN A MOTOR VEHICLE

(71) Applicant: AUDI AG, Ingolstadt (DE)

(72) Inventor: Frank Oldewurtel, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 651 days.

(21) Appl. No.: 14/431,899

(22) PCT Filed: Aug. 19, 2013

(86) PCT No.: PCT/EP2013/002484
§ 371 (c)(1),
(2) Date: Mar. 27, 2015

(87) PCT Pub. No.: WO2014/048529
PCT Pub. Date: Apr. 3, 2014

(65) Prior Publication Data
US 2015/0239347 A1  Aug. 27, 2015

(30) Foreign Application Priority Data

Sep. 28, 2012 (DE) .................. 10 2012 019 063

(51) Int. Cl.
*G06F 17/30* (2006.01)
*B60K 35/00* (2006.01)
(Continued)

(52) U.S. Cl.
CPC ............ *B60K 35/00* (2013.01); *G06F 3/0482* (2013.01); *G06F 3/04817* (2013.01);
(Continued)

(58) Field of Classification Search
CPC ......... G06F 17/30864; G06F 17/30882; G06F 3/04817; G06F 3/0482; G06F 3/04842; B60K 35/00
(Continued)

(56) References Cited

U.S. PATENT DOCUMENTS

| 6,076,092 A * | 6/2000 | Goldberg .............. G06F 16/252 707/683 |
| 2007/0005206 A1* | 1/2007 | Zhang ....................... G06F 3/16 701/36 |

(Continued)

FOREIGN PATENT DOCUMENTS

| CN | 101655380 | 2/2010 |
| CN | 102325151 | 1/2012 |

(Continued)

OTHER PUBLICATIONS

Clinton Essex Franklin Library System, "Internet Basics Lesson 4: How to Use a Search Engine to Search the Internet", Jul. 11, 2012, Clinton Essex Franklin Library System <www.cefls.org:80/esenior_2_4_search_engine.htm>.*

(Continued)

*Primary Examiner* — Mohammad S Rostami
*Assistant Examiner* — Robert F May
(74) *Attorney, Agent, or Firm* — Staas & Halsey LLP

(57) ABSTRACT

A method makes data available in a motor vehicle. A user query is entered using an input device of the motor vehicle. A plurality of sources are searched for data corresponding to the user query, and the search result associated with the found data is displayed by a display device of the motor vehicle. Respective applications of the motor vehicle are assigned to the search results by a data processing device. The applications are designed to reflect the data formats associated with the search results. Only these applications are displayed by the display device. A corresponding system makes the data available in the motor vehicle.

15 Claims, 2 Drawing Sheets

(51) Int. Cl.
*G06F 16/951* (2019.01)
*G06F 16/955* (2019.01)
*G06Q 10/00* (2012.01)
*G06F 3/0481* (2013.01)
*G06F 3/0482* (2013.01)
*G06F 3/0484* (2013.01)

(52) U.S. Cl.
CPC ........ *G06F 3/04842* (2013.01); *G06F 16/951* (2019.01); *G06F 16/9558* (2019.01); *G06Q 10/00* (2013.01)

(58) Field of Classification Search
USPC .......................................................... 707/722
See application file for complete search history.

(56) References Cited

U.S. PATENT DOCUMENTS

| | | | |
|---|---|---|---|
| 2007/0192300 A1* | 8/2007 | Reuther | G06F 16/2452 |
| 2010/0145947 A1* | 6/2010 | Kolman | H04W 4/02 707/736 |
| 2010/0205558 A1 | 8/2010 | Ng et al. | |
| 2010/0250243 A1* | 9/2010 | Schalk | G10L 15/22 704/201 |
| 2010/0333146 A1 | 12/2010 | Pickney et al. | |
| 2011/0137773 A1* | 6/2011 | Davis, III | G01G 19/4142 705/34 |
| 2011/0252038 A1* | 10/2011 | Schmidt | G06F 16/90 707/741 |
| 2012/0244849 A1 | 9/2012 | Thomson | |
| 2012/0284247 A1* | 11/2012 | Jiang | G06F 16/9535 707/706 |
| 2013/0212528 A1* | 8/2013 | Lazaridis | G06F 3/14 715/810 |
| 2013/0282752 A1* | 10/2013 | Day-Richter | G06F 21/62 707/769 |
| 2013/0282755 A1* | 10/2013 | Procopio | G06F 9/44505 707/770 |

FOREIGN PATENT DOCUMENTS

| | | |
|---|---|---|
| CN | 102541853 | 7/2012 |
| CN | 102541930 | 7/2012 |
| DE | 102007037735 | 3/2008 |
| DE | 102010006282 | 8/2010 |
| DE | 102009012533 | 9/2010 |
| DE | 102010029931 | 12/2011 |
| DE | 102011106295 | 1/2012 |
| DE | 102010039440 | 2/2012 |
| DE | 102011113052 | 3/2012 |
| DE | 10 2012 019 063.8 | 9/2012 |
| EP | 2 138 987 | 12/2009 |
| GB | 2365300 | 2/2002 |
| JP | 2010-205024 | 9/2010 |
| KR | 100793114 | 1/2008 |
| WO | WO 2008/072177 A1 | 6/2008 |
| WO | PCT/EP2013/002484 | 8/2013 |

OTHER PUBLICATIONS

Clinton Essex Franklin Library System, "Internet Basics Lesson 4: How to Use a Search Engine to Search the Internet", Jul. 11, 2012, Clinton Essex Franklin Library System <www.cefls.org:80/esenior_2_4_search_engine.htm> (Year: 2012).*
German Office Action for German Priority Patent Application No. 10 2012 019 063.8, dated Mar. 20, 2013, 7 pages.
English language International Search Report for PCT/EP2013/002484, dated Nov. 7, 2013, 2 pages.
WIPO English Language Translation of the International Preliminary Report on Patentability for PCT/EP2013/002484, dated Apr. 2, 2015, 9 pages.
Chinese Office Action dated Feb. 7, 2017 in corresponding Chinese Patent Application No. 201380050883.0.
European Office Action dated Jul. 24, 2019 in European Patent Application No. 13 753 581.1.

* cited by examiner

METHOD AND SYSTEM FOR MAKING DATA AVAILABLE IN A MOTOR VEHICLE

CROSS REFERENCE TO RELATED APPLICATIONS

This application is based on and hereby claims priority to International Application No. PCT/EP2013/002484 filed on Aug. 19, 2013 and German Application No. 10 2012 019 063.8 filed on Sep. 28, 2012, the contents of which are hereby incorporated by reference.

BACKGROUND

The invention relates to a method for providing media content in an automobile. Furthermore, the invention relates to a system for providing media content in an automobile.

Such a method and system are known from DE 10 2010 006 282 A1. According to the method disclosed therein, a user query is captured by an input device of an automobile, after which a plurality of sources are searched for data corresponding to the user query and then the search results associated with the data found are displayed by a display device of the automobile.

DE 10 2007 037 735 A1 shows a system for providing and presenting media content in an automobile, wherein data provided on a home server can be displayed by a display device within the automobile.

DE 10 2010 029 931 A1 shows a method in which vehicle data are interchanged with a server.

DE 10 2010 039 440 A1 shows a control unit for a vehicle, which control unit is connected to a network of the vehicle, wherein at least one output unit is provided that is connected to the network, wherein the control unit provides a service for using the at least one output unit.

DE 10 2011 113 052 A1 shows a method in which text data provided by an Internet service are converted into corresponding voice data in the vehicle and are then output audibly.

DE 10 2011 106 295 A1 shows a method for the bidirectional transmission of data between motor vehicles and a service provider for the purpose of interchanging traffic information.

The progressive networking of motor vehicles to their environment and the constantly rising number of sources on the Internet have seen user provided with a continually growing range of online services in vehicles. This results in increased complexity from the point of view of the user, which can lead to possible overtaxing or distraction of the driver.

SUMMARY

One possible object is to provide a method and a system for providing data in an automobile that allow simplified and road-safe provision of data in an automobile.

The inventor proposes a method for providing data in an automobile. The method involves a user query being captured by an input device of the automobile, and then a plurality of sources are searched for data corresponding to the user query and the search results associated with the data found are displayed by a display device of the automobile, the method being distinguished in that the search results are assigned respective applications of the automobile by a data processing device, which applications are designed to reproduce the respective formats of the data as are associated with the search results, and just these applications are displayed by the display device.

By way of example, the data may be information and/or media content in the form of music files, video files, text files, image files and the like. Furthermore, the data may also be vehicle-internal data, such as information about a status of a vehicle setting, sensor data captured or conditioned for the driver or the expected quality of a mobile radio network on a planned route that is to be covered with the vehicle. This list of examples is not intended to be understood to be conclusive, however.

Firstly, a user can thus make substantially any user queries by a single input device of the automobile, regardless of what type of data the user is seeking. Appropriately suited sources are automatically searched, on the basis of the submitted or captured user query, for data corresponding to the queries, so that the user himself does not need to make any kind of statements or any selection for the sources that are to be searched. Finally, the search results found are analyzed to establish which of the applications of the automobile are actually suited to actually being able to reproduce the respective formats of the data as are associated with the search results. On the basis of this analysis, the display device of the automobile actually displays just those applications that are suited to outputting the data found.

In contrast to the method shown in DE 10 2010 006 282 A1, a user can thus submit a query totally independently of application, as a result of which corresponding search results are provided for the user on an application-specific basis. The effort for users when making corresponding queries is therefore substantially reduced in terms of complexity, so that multiple independent information and media sources can be searched in a particularly simple manner and corresponding results can be provided for a user. This allows the user to consume the data he requires in a simple and intuitive manner, which firstly substantially simplifies the search for, provision and use of data and secondly, in particular, also increases road safety when controlling the automobile.

The method described thus allows the user to use a wide variety of data in a simple and integral manner, with the method counteracting overtaxing and distraction of the user, particularly the driver. As a result of different online services being abstracted and bundled into a single vehicle function, it is additionally possible to reduce development time and development costs. The main reason for this is that the software development for a large number of individual infotainment functions prompts program code doublings and overhead during implementation, which can be significantly reduced by this method. In addition, the method is so flexible that relevant target vehicle functions in the form of respective applications, particularly of an infotainment system of the automobile, are reusable and can be extended simply and quickly, e.g. if additional sources need to be integrated for new kinds of services. The method can be applied to different kinds of sources (online or locally).

In one advantageous embodiment, the captured user query is sent to a vehicle-external data processing device that searches the sources for the data corresponding to the user query and transmits the search results to the automobile before said search results are displayed by the display device. The actual data processing for corresponding user queries does not need to be performed in the vehicle, therefore, and vehicle-external provision of an appropriate data processing device allows much greater computer capacities to be provided in a simple manner, so that a plurality of sources can be searched particularly quickly and effectively in a particularly short time.

In an advantageous refinement, a check is performed to determine which of the applications can be operated on the basis of the immediate driving situation, and only those applications with immediate permission to operate are displayed. By way of example, during the driving mode of the automobile it may be prohibited for video content to be displayed on a screen that is in the field of vision of a driver of the automobile. Should the user query lead to search results with one or more video files, inter alia, the relevant application, for example a video player, would nevertheless not be shown in the form of the result presentation in this case while the automobile is travelling. In other words, a check is thus continuously performed to determine which of the applications can actually be operated during a driving mode of the automobile or while said automobile is at a standstill, so that only appropriately approved applications are actually presented to the user during result presentation. Firstly, this reduces the complexity of the result presentation, and secondly, it particularly increases road safety when driving the automobile.

According to a further advantageous embodiment, the data processing device searches vehicle-external and/or vehicle-internal sources. The vehicle-external sources can substantially be any sources on the Internet, such as video portals, music portals, news portals and the like. In addition, the vehicle-external sources can also be mobile memory devices, for example including smart phones, notebooks or the like. The vehicle-internal sources are memory units provided in the vehicle, such as hard disks, SD cards and the like, that can be used to supply data to an infotainment system or a wide variety of applications of the automobile, for example. The selection and searching of the sources thus involve resorting to both vehicle-external and vehicle-internal sources, so that the best possible search results are obtained.

In a further advantageous embodiment, the search results are provided in the form of source-specific addresses at which the respective data fitting the user query can be retrieved. In other words, addresses or reference addresses, for example in the form of URLs, directory details for local memory sources within the automobile or the like, are thus provided for the queried or sought information content and media content. These source-specific addresses can be used to explicitly retrieve the information content or media content found. By way of example, behind every presented application there may be stored a list of corresponding addresses for the information content and media content found, which are then able to be consumed by a user directly using display, reproduction and/or playback functions provided in the motor vehicle as appropriate. The fact that initially only the source-specific addresses are provided keeps the volume of data that accordingly needs to be downloaded small at first, with only those data or data packets that the user explicitly requires being downloaded.

In a further advantageous embodiment, the sources are searched by source-specific search queries. Source-specific search queries is intended to be understood to mean that search routines prescribed by the respective sources or corresponding programming interfaces, what are known as APIs, are used and filled with search queries in accordance with the user query, so that said search queries can each also be understood or interpreted by the sources. The advantage in this case is that a user can make only a very general user query, for example in the form of a search query, using free search terms, the latter being transformed for the respective sources in an adjusted and interpretable form. This means that it is no longer necessary for the user to use specific applications in each case to make his query. The effort for a user query is substantially reduced for the user thereby and therefore user friendliness is also improved. The time involvement for submitting a user query is substantially reduced and hence distraction of the user is reduced in equal measure.

Preferably, the communication between the automobile and the data processing device is effected via a mobile radio link. By way of example, this can be effected using UMTS or LTE or the like, with an HTTP protocol being used, for example. If the automobile should be within a usable WLAN, it is additionally or alternatively also possible for the communication between the automobile and the data processing device to be effected via said WLAN connection. Alternatively or additionally, it is also possible to use a Bluetooth link, for example. Thus, wireless communication is used—whenever possible—between the automobile and the data processing device. This allows corresponding search queries or user queries to be transmitted to the data processing device, and corresponding results to be received therefrom, substantially at any time.

In a further advantageous refinement, the communication between the data processing device and the vehicle-external sources is effected via a broadband connection. In particular, the communication between sources connected to the Internet and the data processing device is effected via a broadband connection, so that a particularly efficient and effective search can be made. By contrast, the vehicle-internal sources are likewise coupled to the data processing device via a mobile radio link. Alternatively or additionally, this can also be effected in cabled fashion, however.

The inventor also proposes a system for providing data in an automobile, which comprises an input device of the automobile, which input device is designed to capture a user query, a data processing device that is designed to search a plurality of sources for data corresponding to the user query, a display device of the automobile, which display device is designed to display the search results associated with the data found, wherein the system is distinguished in that the data processing device is designed to assign the search results respective applications of the automobile that are designed to reproduce the respective formats of the data as are associated with the search results, and the display device is designed to display just these applications. Advantageous refinements of the method can be regarded as advantageous embodiments of the system, and in this case particularly the system comprises devices that can be used to carry out the method.

Further advantages, features and details will emerge from the following description of preferred exemplary embodiments and with reference to the drawing. The features and combinations of features cited in the description above and features and combinations of features cited in the description of the figures below and/or shown in the figures alone can be used not only in the respectively indicated combinations but also in other combinations or on their own without departing from the scope.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
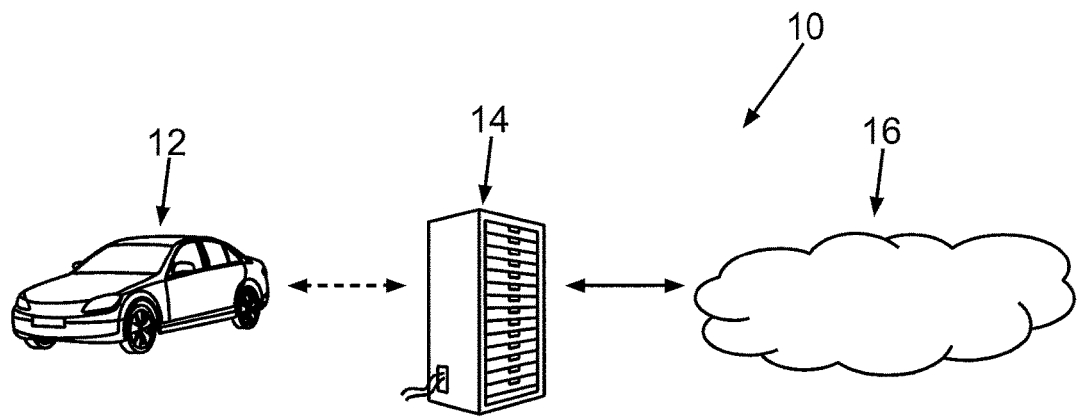
FIG. 1 shows a schematic illustration of a system for providing data in an automobile that is coupled via a mobile radio link to a vehicle-external data processing device that for its part is connected to a plurality of sources.

Reference will now be made in detail to the preferred embodiments of the present invention, examples of which are illustrated in the accompanying drawings, wherein like reference numerals refer to like elements throughout.

A system 10 for providing data in an automobile 12 is shown in a schematic view in FIG. 1. The system 10 comprises a vehicle-external data processing device 14 that is connected to a plurality of sources 16.

Figure 2:
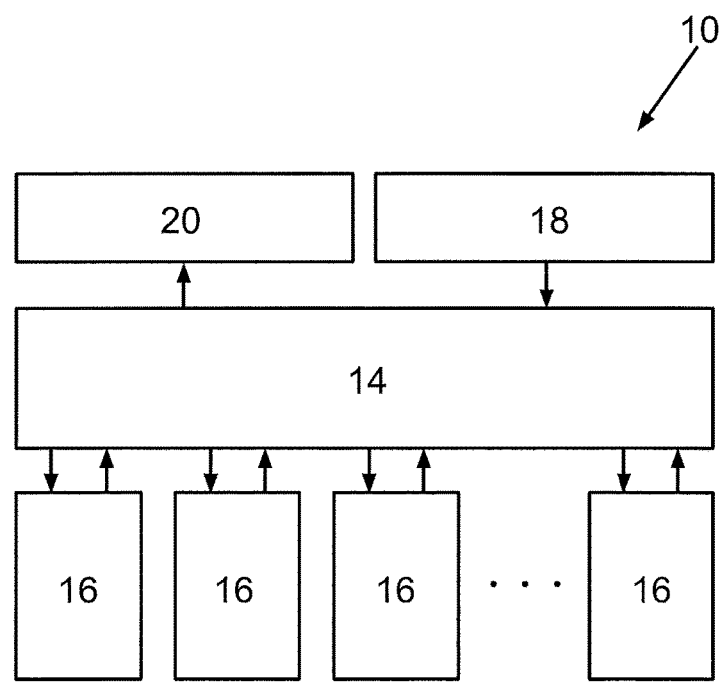
FIG. 2 shows a further schematic illustration of the system for providing data in an automobile, wherein the elements of the vehicle, the elements of the data processing device and the elements of the source and the connection of said elements to one another are shown.

FIG. 2 shows the system 10 shown in FIG. 1 in an alternative schematic illustration. At the vehicle, the system 10 comprises an input device 18 that is designed to capture a user query and also a display device 20 that is designed to display the search results associated with the data found.

By way of example, the input device 18 may be a voice recognition module by which the voice commands from a user can be captured, analyzed and then transmitted to the data processing device 14. Furthermore, the input device 18 may alternatively or additionally also comprise a control unit—not shown here—that users can use to make text-based queries to the system 10, for example.

By way of example, the display device 20 is a display that is associated with an infotainment system—not shown here—of the automobile 12 and that can be used to display a wide variety of applications of the automobile that are able to be used to reproduce the data found. By way of example, the aforementioned applications may be a video player, a music player, an Internet browser, applications for using social media content and the like.

The sources 16, which are connected by the data processing device 14, may be both vehicle-external sources and vehicle-internal sources. By way of example, the vehicle-external sources may be music portals, video portals, social media portals, news portals, search engines on the Internet, and the like, which are connected to the Internet. Vehicle-internal sources may be memory devices, such as hard disks installed in the vehicle, CDs, DVDs, memory cards or the like, which may be coupled to an infotainment system of the automobile 12, for example.

A method for providing data in the automobile 12 will be explained below. First of all, a user query is captured by the input device 18 of the automobile 12. Said user query is then forwarded via a mobile radio link to the data processing device 14, which takes the user query as a basis for searching appropriate sources 16 for data and information content corresponding to the user query. In this case, the search of the sources 16 is made using source-specific search queries.

The search results are provided in the form of source-specific addresses at which the respective data fitting the user query can be retrieved. In other words, following processing of respective function calls, the respective resultant event responses from all connected sources 16 are provided in conditioned form for the display device 20 used as an output block. The source-specific addresses used as reference addresses can be used to explicitly retrieve the data found, which may be information content and/or media content. By way of example, the source-specific addresses are URLs, appropriate directory details within vehicle-internal sources 16 and the like.

In this case, the communication between the automobile 12 and the data processing device 14 is effected via a mobile radio link, for example via UMTS or LTE. Alternatively, it is also possible for the communication between the automobile 12 and the data processing device 14 to be effected via a WLAN connection, for example should the automobile 12 be at a standstill and should it be positioned in the range of a WLAN connection.

The communication between the data processing device 14 and the vehicle-external sources 16 is effected via a broadband connection, for example in the form of a DSL or the like. The communication between the data processing device 14 and the vehicle-internal sources 16 is effected via a mobile radio link.

The search results found are assigned by the data processing device 14 to respective applications of the automobile 12 that are designed to reproduce the respective formats of the media content that are associated with the search results.

Figure 3:
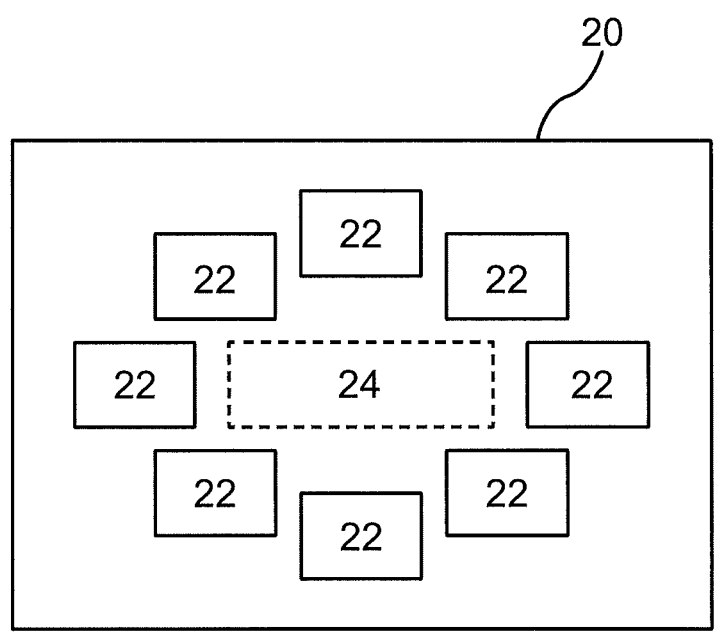
FIG. 3 shows a schematic illustration of a display device that is provided in the automobile and that is used to present the search results found by the data processing device.

A corresponding representation of the search results is shown in a schematic illustration in FIG. 3. The display device 20 shows various symbols 22 that each represent various applications of the automobile 12. In this case, the display device 20 is designed to display just those symbols for the respective applications that are actually suited to being able to reproduce the search results found.

When one of the respective symbols 22 is tapped or selected, a result representation, for example in the form of a list, is opened that shows the respective search results on an application-specific basis. This can be effected in the form of respective addresses or links, for example, and as soon as the respective links are clicked the corresponding application is used to perform reproduction of the media content or information content found. In addition, the search results can be provided and presented in the form of a short description or a name or a designation for identifying the search result, for example. Behind the designation, there may then be an actual link, for example in the form of a hyperlink, stored in a manner concealed from the user, so that clicking on the designation prompts a connection to the stored address to be set up. Furthermore, within a window 24, that user query that has led to the result conditioning shown by way of example in FIG. 3 is displayed. This means that it is a simple matter for a user to comprehend which user query has led to the selection of which application with correspondingly stored search results.

To increase road safety for the automobile 12, provision is additionally made for a check to be performed to determine which of the applications can be operated on the basis of the immediate driving situation, and only those applications with immediate permission to operate are also displayed on the display device 20.

By way of example, a user query can mean that one of the search results would lead to a video stored in a video portal, but the system 10 is simultaneously used to establish that the automobile 12 is immediately being moved or driven, as a result of which a corresponding application for playing back the video found is not shown in the result presentation in the first place.

In addition, it is naturally also possible for the automobile 12 to comprise a plurality of further display devices, which are not shown here, but can be used to play back video content, two such display devices being arranged in the rear passenger area, for example. In such a case, the appearance of the result presentation could be such that the video found or the link to the video can be played back only on the rear display devices while the automobile 12 is travelling, for example.

Similarly, it is also conceivable for relevant text outputs from e-mail services, Internet pages and the like, for example, that are in a field of view of the driver not to be able to be presented in the display device 20 while the automobile 12 is travelling. Firstly, a driver is not induced by the relevant result presentation in the first place to select applications that would unduly distract him from what is happening on the road, and secondly, a result presentation appropriate to the situation is also presented, which means that the distraction for the driver is minimized overall.

A further example is used to illustrate the method for providing data once again. By way of example, a user inputs a free text search query "Madonna". The data processing device 14 conditions said query and processes it. Next, said query is mapped onto the different sources, that is to say input on a source-specific basis in each case, so that, by way of example, a music source outputs all pieces and/or albums by the artist Madonna. In addition, by way of example, an online video platform supplies the most frequently watched Madonna videos as search results. Furthermore, by way of example, it is also possible for concert locations and dates within a present radius of the automobile to be returned as a further query result by a further source, for example by a ticket provider or the like. A wide variety of possible results and result types are therefore open to the user, which are displayed by the display device 20 in a manner conditioned or assigned on an application-specific basis—as already explained.

Linkage of information sources and media sources from various providers, particularly via the Internet, can be implemented using existing programming interfaces (APIs) in the data processing device 14 established or provided in a back end, for example. The data processing device 14 or the back end is thus used as an abstraction layer by which the user queries can be analyzed and forwarded to appropriate sources 16 for the purpose of finding corresponding data. Appropriate interfaces between the data processing device 14 used as an abstraction layer and the linked sources 16 are provided within the system 10 accordingly.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV,* 69 USPQ2d 1865 (Fed. Cir. 2004).

The invention claimed is:

1. A method for providing data in an automobile, comprising:
    capturing a user query by an input device of the automobile;
    searching a plurality of sources for data corresponding to the user query, the plurality of sources being searched to produce search results associated with the user query;
    receiving the search results at the automobile;
    after receiving the search results, comparing each search result to a plurality of available applications available on the automobile and assigning each of the search results to at least one appropriate application from the plurality of available applications available on the automobile based on the comparison, the at least one appropriate application being a subset of the available applications such that at least one available application is not appropriate for the search results, the search results being assigned by a data processing device;
    grouping all of the appropriate applications to which at least one search result was assigned to into a set of appropriate applications;
    determining which of the appropriate applications in the set of appropriate applications can be operated based on a comparison of a current driving situation to predetermined permitted driving situations for each of the appropriate applications;
    displaying activation information for only the appropriate applications in the set of appropriate applications that were determined as operable based on the comparison of the current driving situation;
    after displaying the activation information, receiving a user input regarding a selected appropriate application; and
    displaying the search results by a display device with search result data formatted according to the selected appropriate application, wherein
        for at least one of the search results, the search result data is media content,
        the media content has a format of at least one of a music file, a video file, a text file, and an image file, and
        the user query is sent to a vehicle-external data processing unit that searches the plurality of sources for the data corresponding to the user query and transmits the search results to the automobile before the search results are displayed by the display device.

2. The method as claimed in claim 1, wherein
the data processing device searches for data corresponding to the user query, and
the searching is performed on vehicle-external and/or vehicle-internal sources.

3. The method as claimed in claim 1, wherein
the data processing device searches for data corresponding to the user query, and
the searching is performed on both at least one vehicle-external source and at least one vehicle-internal source.

4. The method as claimed in claim 1, wherein
the search results are provided in the form of source-specific addresses at which respective data fitting the user query can be retrieved.

5. The method as claimed in claim 1, wherein
the sources are searched using source-specific search queries.

6. The method as claimed in claim 1, wherein
communication between the automobile and the data processing device is effected via a mobile radio link.

7. The method as claimed in claim 1, wherein
the sources are vehicle-external sources that are external to the automobile, and
communication between the data processing device and the vehicle-external sources is effected via a broadband connection.

8. The method as claimed in claim 1, wherein
each available application is associated with an icon for display on the display device, the display device displays only the icons associated with the at least one appropriate application determined as operable based on the comparison of the current driving situation, and selection of one icon opens a respective application.

9. The method as claimed in claim 8, wherein each icon is displayed with information identifying the respective application.

10. The method as claimed in claim 8, wherein the selected appropriate application is selected by the user tapping the associated icon on the display device.

11. The method as claimed in claim 8, wherein the user query is displayed together with the icons associated with the at least one appropriate application.

12. The method as claimed in claim 1, wherein the search results are associated with respective hyperlinks, the selected appropriate application presents a list of the search results, and selecting one search result activates the respective hyperlink.

13. The method as claimed in claim 1, wherein the search results are assigned to at least two appropriate applications determined as operable based on the comparison of the current driving situation, and the user selects as the selected appropriate application, one of the at least two appropriate applications for displaying the search results.

14. The method as claimed in claim 1, wherein the automobile has first and second available applications, first and second user queries are captured to respectively produce first and second search results, for the first search results, activation information for the first available application is displayed and activation information for the second available application is not displayed, and for the second search results, activation information for the second available application is displayed and activation for the first available application is not displayed.

15. A system to provide data in an automobile, comprising:

an input device of the automobile, to capture a user query;

at least one data processing device to:

search a plurality of sources for data corresponding to the user query, the plurality of sources being searched to produce search results associated with the user query;

receive the search results;

compare, after the search results are received, each search result to a plurality of available applications available on the automobile and assign each of the search results to at least one appropriate application from the plurality of available applications available on the automobile based on the comparison, the at least one appropriate application being a subset of the available applications such that at least one available application is not appropriate for the search results;

group all of the appropriate applications to which at least one search result was assigned to into a set of appropriate applications;

determine which of the appropriate applications in the set of appropriate applications can be operated based on a comparison of a current driving situation to predetermined permitted driving situations for each of the appropriate applications; and a display device of the automobile, connected to the data processing device to:

display activation information for only the appropriate applications in the set of appropriate applications that were determined as operable based on the comparison of the current driving situation; and display the search results with search result data formatted according to a selected appropriate application, information on the selected appropriate application being received only after the activation information is displayed, wherein for at least one of the search results, the search result data is media content, the media content has a format of at least one of a music file, a video file, a text file, and an image file, and the user query is sent to a vehicle-external data processing unit that searches the plurality of sources for the data corresponding to the user query and transmits the search results to the automobile before the search results are displayed by the display device.

* * * * *